3,595,749
PURIFICATION OF CULTIVATED
MICRO-ORGANISMS
Alastair J. Clark, Banchory, and Raymond J. Hunt, Larbert, Scotland, assignors to The British Petroleum Company Limited, London, England
No Drawing. Filed June 19, 1968, Ser. No. 738,128
Claims priority, application Great Britain, June 19, 1967, 28,063/67
Int. Cl. C12b 1/26
U.S. Cl. 195—28                 17 Claims

ABSTRACT OF THE DISCLOSURE

A process for the removal, at least in part, of contaminants from a mixture of a micro-organism and contaminants, the contaminants consisting of or including a hydrocarbon oil and water, which comprises subjecting the mixture to drum drying in a drier having a pair of hot rolls which constitute a nip whereby at least part of the water is removed by evaporation and wherein an oil enriched product is removed from above the nip and a micro-organism enriched product is removed, from at least one roll, below the nip.

---

The micro-organism enriched product may be subjected to solvent extraction.

Suitable micro-organisms include yeasts, for example, *Candida lipolytica* or *C. tropicalis*, bacteria or moulds.

The process may be applied to the product obtained by growing a micro-organism on a hydrocarbon substrate, for example, gas oil.

This invention relates to a process for the purification of cultivated micro-organisms and to a process for the cultivation and purification of micro-organisms.

According to the present invention there is provided a process for the removal, at least in part, of contaminants from a mixture of a micro-organism and contaminants, said contaminants consisting of or including a hydrocarbon oil and water, which comprises subjecting said mixture to drum drying in a drier having a pair of hot rolls which constitute a nip whereby at least part of the water is removed by evaporation and wherein an oil enriched product is removed from above the nip and a micro-organism enriched product is removed, from at least one roll, below the nip.

When operating with a drum drier as herein described it is an important feature of the invention that the micro-organism mixture which passes the nip has a favourable character even though the mixture fed into the nip is of a pasty or tacky character. The change in character is believed to be caused by a redistribution of the cells of the micro-organism in the mixture under the shearing forces of the nip which causes the mixture, which is a dilatent body, superficially to dry out. In consequence the mixture immediately after passing the nip can be removed from the drum by knifing, this notwithstanding that the mixture subsequently relaxes and again takes on a tacky character. Whether or not the mixture after removal from the roll becomes tacky it is found that this mixture retains to some degree a flaky character which it is believed is a beneficial quality when the mixture is subsequently solvent extracted and particularly when the solvent diluted mixture is subjected to filtration for the removal of the solid micro-organism phase. As a result of the treatment in the nip of a drum drier, the filtration stage or stages can be operated more efficiently with good throughput rates.

The process according to the invention wherein there is used a mixture having an oil content such that in operation oil is retained above the nip of a pair of rollers is of particular value for the cultivation of a micro-organism using a feedstock which consists only in part of hydrocarbons which are metabolisable under the conditions of cultivation. Preferably this feedstock will contain less than 30% by wt. of normal paraffins. Preferably the mixture which is fed to the nip of the rollers contains more than 30% by wt. of oil based on the dry weight of micro-organism which is contained in the mixture.

Two preferred systems for the cultivation and purification of micro-organisms are now described in greater detail.

According to the first system there is provided a process which comprises cultivating a micro-organism in the presence of (a) a feedstock consisting substantially completely of straight chain hydrocarbons (b) an aqueous nutrient medium and (c) a free oxygen-containing gas, as an optional stage, decanting the product to obtain an aqueous phase and a first fraction containing the micro-organism aqueous nutrient medium and residual hydrocarbon oil, subjecting the fermenter product or said first fraction to centrifuging in one or more stages to obtain a second fraction containing aqueous nutrient medium and to obtain a mixture containing micro-organisms, aqueous nutrient medium and at least part of the residual oil, passing said mixture into the nip between two rollers of a drum dryer, evaporating substantially all of the water contained in said mixture and recovering from the rollers a second mixture consisting of micro-organism and oil, subjecting this second mixture to solvent extraction and recovering the solid micro-organism by filtration.

According to the second system there is provided a process which comprises cultivating a micro-organism in the presence of (a) a feedstock containing straight chain hydrocarbons together with hydrocarbons which are not metabolisable by the micro-organism under the conditions of cultivation, (b) an aqueous nutrient medium and (c) a free oxygen-containing gas, as an optional stage decanting the product to obtain an aqueous phase and a first fraction containing the micro-organism, aqueous nutrient medium and residual hydrocarbon oil, subjecting either this first fraction or the fermenter product to centrifuging in one or more stages to obtain a second fraction containing aqueous nutrient medium and to obtain a mixture containing micro-organism, aqueous nutrient medium and at least part of the residual oil, and optionally to recover a fraction comprising part of the residual oil thereafter passing said mixture into the nip between two rollers of a drum dryer under conditions such that an oil enriched mixture is returned above the nip and an oil depleted mixture passes the nip evaporating substantially all of the water contained in said oil depleted mixture and recovering from the rollers a dried mixture consisting of micro-organism and oil, subjecting this dried mixture to solvent extraction, recovering the solid micro-organism by filtration. Preferably the drum drier is operated in continuous manner and preferably, from the oil enriched mixture held above the nip of the rollers, a recycle stream is removed and fed back to the cultivation stage or to a decanting or centrifuging stage.

The recycle stream may be obtained from the oil enriched mixture by decanting; in this case it may consist substantially completely of an oil phase. The recycle stream may if desired consist of a cream of micro-organism and oil.

When centrifuging in more than one stage the intermediary product containing a micro-organism is preferably diluted with water, suitably to approximately the same concentration of micro-organism as is contained in the fermenter product, before treatment in the next centrifuging stage.

The process including optional process stages will now be described in greater detail.

Micro-organisms which are cultivated as herein described may be yeasts, moulds or bacteria. Within the term "micro-organism" used herein we include mixtures of micro-organisms.

Preferably when a yeast is employed this is of the family Cryptococcaceae and particularly of the sub-family Cryptococcoideae however, if desired there may be used, for example, ascosporogeneous yeasts of the sub-family Saccharomyceloideae. Preferred genera of the Cryptococcoideae family are Torulopsis (also known as Torula) and Candida. Preferred strains of yeast are as follows.

In particular it is preferred to use the specific stock of indicated reference number; these reference numbers refer to CBS stock held by the Centraal Bureau voor Schimmelcultures, Baarn, Netherlands; to CMI stock held by the Commonwealth Mycological Institute, Kew, England; and to NCYC stock held by the National Collection of Yeast Cultures, Nutfield, England.

| Specie: | Preferred strain |
|---|---|
| Candida brumptii. | |
| Candida catenulata. | |
| Candida clausenii. | |
| Candida humicola. | |
| Candida intermedia. | |
| Candida krusei. | |
| Candida lipolytica | CBS No. 2078; No. 599; CMI No. 93743; NCYC No. 376; No. 153 |
| Candida melibiosi. | |
| Candida parapsilosis | CMI No. 83350. NCYC No. 458 |
| Candida pulcherrima. | |
| Candida rugosa. | |
| Candida stellatoidea. | |
| Candida tropicalis | NCYC No. 4 |
| Candida utilis | CMI No. 2331 |
| Debaryomyces kloeckeri. | |
| Hansenula anomala. | |
| Pichia guilliermondii | CBS No. 2084; No. 2031 |
| Rhodotorula glutinis. | |
| Torulopsis famata. | |
| Torulopsis magnoliae. | |

Of the above *Candida lipolytica* and *C. tropicalis* are particularly preferred.

If desired the micro-organism may be a mould. Suitable moulds are of the family Moniliaceae; a suitable genus is Penicillium and preferably there is used *Penicillium expansum*. Another suitable genus is Aspergillus.

If desired the micro-organism may be a bacterium.

Suitably the bacteria are of one of the orders: Pseudomonadales, Eubacteriales and Actinomycetales.

Preferably the bacteria which are employed are of the families Corynebacteriaceae, Micrococcaceae, Achromobacteraceae, Actinomycetaceae, Rhizobiaceae, Bacillaceae and Pseudomonadaceae. Preferred species are *Bacillus megaterium*, *Bacillus subtilis* and *Pseudomonas aeruginosa*. Other species which may be employed include:

Achromobacter sp.
Brevibacterium sp.
Corynebacterium sp.
Flavobacterium sp.
Micrococcus sp.
Pseudomonas sp.
*Mycobacterium smegmatis*
Mycobacterium sp.
*Nocardia erythropolis*
*Nocardia minima*
*Nocardia opaca*
*Nocardia polychromogenes*
*Nocardia rubra*
*Nocardia rubropertincta*
*Streptomyces griseolus*
*Streptomyces rimosus*
Streptomyces sp.

A suitable nutrient medium for yeasts and moulds has the composition:

| | Grams |
|---|---|
| Diammonium phosphate | 20 |
| Potassium chloride | 11.5 |
| Magnesium sulphate 7H$_2$O | 6.5 |
| Zinc sulphate | 1.7 |
| Manganese sulphate 1H$_2$O | 0.45 |
| Ferrous sulphate 7H$_2$O | 0.68 |
| Tap water | 200 |

Distilled water (to make up to 1000 mls.).

Preferably therefore the aqueous nutrient medium is maintained at a desired pH by the step-wise or continuous addition of an aqueous medium of high pH value. Usually, when using moulds or yeasts and in particular when using *Candida lipolytica*, the pH of the nutrient medium will be maintained in the range 3–6 and preferably in the range 4–5. (Bacteria require a higher pH usually 6.5–8.) Suitable alkaline materials for addition to the growth mixture include sodium hydroxide, potassium hydroxide, disodium hydrogen phosphate and ammonia, either free or in aqueous solution.

The optimum temperature of the growth mixture will vary according to the type of micro-organism employed and will usually lie in the range 25–35° C. When using *Candida lipolytica* the preferred temperature range is 28–32° C.

The take-up of oxygen is essential for the growth of the micro-organism. The oxygen will usually be provided as air. In order to maintain a rapid rate of growth, the air, used to provide oxygen, should be present in the form of fine bubbles under the action of stirring. The air may be introduced through a sintered surface. However there may be used the system of intimate aeration known as "vortex aeration."

Preferably the fermenter is operated under continuous conditions.

The product taken off from the fermenter is a mixture of micro-organisms, aqueous nutrient medium and residual oil. Preferably this product is subjected to decanting to remove a major proportion of the aqueous nutrient medium. The remainder of the product is preferably subjected to centrifuging, in one or more stages, to remove part of the remaining aqueous phase (also, when a sufficient proportion of oil is present, to remove an oil phase) and to recover a mixture of micro-organism, aqueous medium and residual oil.

If desired, the product recovered after centrifuging may be washed with water and again centrifuged.

Optionally, the mixture finally obtained by centrifuging may be subjected to a heat treatment to destroy, wholly or in part, the enzymic activity of the micro-organism. Preferably the mixture is held at 60° C. for 40 to 60 mins.

The mixture, with or without the heat treatment herein described is preferably subjected to drum drying under conditions such that the mixture passes through the nip between a pair of heated rollers. If the amount of oil which is contained in the mixture so treated is such that oil is squeezed from the mixture, the drum drier should be of a type such that an oil enriched fraction can be removed from a zone above the rollers. This fraction may be withdrawn from the process or recycled to the fermenter or to the decanter or to a centrifuge.

The mixture which passes the nip is dried on the rollers and while still friable is knifed away. The material so removed is of a flaky character and is particularly suitable for further treatment by solvent extraction and filtration since the flaky character of the material facilitates filtration.

In accordance with the invention it is possible to use mild conditions of solvent extraction and to recover a micro-organism which retains a substantial part of its original lipid content. Alternatively, if desired, more drastic conditions of solvent extraction may be used to recover a micro-organism of low lipid content.

Preferably solvent extraction is carried out by the use of a solvent consisting of or containing a hydrocarbon. Preferably the hydrocarbon has 4–7 carbon atoms per molecule. Preferably the hydrocarbon is a paraffin and preferably, the paraffin is a straight chain paraffin. Normal pentane and normal hexane are suitable solvents.

If desired the extraction of the hydrocarbons by means of a hydrocarbon solvent is preceded by extraction by means of an alcohol, preferably ethanol or isopropyl alcohol.

If desired there may be used an extraction stage using, as solvent, a mixture of a hydrocarbon with, for example, ethanol. Thus there may be used a solvent consisting of 80% by wt. of hexane and 20% by wt. of ethanol.

The hydrocarbons recovered in the extract phase by solvent extraction, if metabolisable, may be recycled to the micro-organism cultivation stage.

According to a preferred feature of this invention there is provided a process which comprises cultivating a micro-organism in a manner as hereinbefore described in the presence of a petroleum fraction consisting in part of straight chain hydrocarbons and having a mean molecular weight corresponding to at least 10 carbon atoms per molecule, and in the presence of an aqueous nutrient medium; and in the presence of a gas containing free oxygen, and separating from the mixture, on the one hand, the micro-orgaism and, on the other hand, a petroleum fraction having a reduced proportion of straight chain hydrocarbons or which is free of said straight chain hydrocarbons and thereafter treating the micro-organism as hereinbefore described.

The process of the invention is of particular value for the treatment of petroleum gas oil fractions which contain straight chain hydrocarbons in the form of waxes, since by the process of the invention a gas oil of improved pour point is obtained while the waxes are converted to a valuable product.

Usually the straight-chain hydrocarbons will be present in the feedstocks according to the invention as paraffins; however, the straight chain hydrocarbons may be present as olefins; also there may be used a mixture containing straight chain paraffins and olefins.

It is a feature of this invention that when cultivating yeasts in the presence of the feedstocks hereinbefore described under conditions favouring the growth of the yeasts at the expense of the straight chain hydrocarbons, the other hydrocarbons, for example isoparaffins, naphthenes and aromatics are not metabolised or, at most, the proportion which is metabolised is very small. Furthermore, unlike conventional chemical processes governed by the law of mass action, the rate of removal of straight chain hydrocarbons is not substantially reduced as the proportion of these hydrocarbons in the overall mixture of hydrocarbons decreases (except of course in the very final stages of removal). Thus, when desired, the percentage conversion of straight chain hydrocarbons which is achieved can be maintained at a value approaching 100% without necessitating a very disproportionate expenditure of contact time to achieve small improvements. Furthermore, in a continuous process, this high percentage conversion can be achieved without resorting to the use of a long reaction path.

By the application of this process under conditions which limit the metabolisation of the straight chain hydrocarbons it is possible to operate with the removal of only a desired proportion of these hydrocarbons.

Suitable feedstocks to the process of the invention include kerosine, gas oils and lubricating oils, these feedstocks may be unrefined or may have undergone some refinery treatment, but must contain a proportion of straight chain hydrocarbons in order to fulfill the purpose of this invention. Suitably the petroleum fraction will contain 3–45% by weight of straight chain hydrocarbons.

Preferred methods for use in the cultivation of the micro-organism and for the recovery of the product are described in British patent specification No. 914,567—also in British patent application Nos.:

36873/62 (SFP.1125), 44606/62 (SFP.1300), 46906/62 (SFP.1300-A), 25210/63 (SFP.1401), 2234/63 (SFP.1404), 49049/62 (SFP.1407), 49050/62 (SFP.1408), 49052/62 (SFP.1410), 45011/63 (SFP.1611), 45010/63 (SFP.1612), 49055/62 (SFP.1413), 49056/62 (SFP.1414), 49057/62 (SFP.1415), 45009/62 (SFP.1416), 49060/62 (SFP.1418), 49061/62 (SFP.1419), 49062/62 (SFP.1420), 49063/62 (SFP.1421), 45007/63 (SFP.1622), 45006/63 (SFP.1623), 45004/63 (SFP.1626), 45005/63 (SFP.1627), 45002/63 (SFP. 1628), 7623/63 (SFP.1429), 19271/63 (SFP.1440), 45001/63 (SFP.1641), 20803/63 (SFP.1442), 44998/63 (SFP.1603), 45102/63 (SFP.1609), 38942/63 (SFP.1508), 183/64 (SFP.1512), 184/64 (TD.1513), 11860/64 (SFP.1516), 182/64 (SFP.1522); also in the specifications of French patent application Nos: 924,254 (SFP.1402), 925,327 (SFP.1403), and in Belgian specification No: 514,960 (SFP.1400-X).

Preferably when the micro-organism is a yeast for example, *Candida lipolytica,* the mixture or fractions at successive stages of the process have compositions which fall in the following ranges, parts being by weight.

| | Case 1 (Gas oil) | Case 2 (n-paraffins) |
|---|---|---|
| Feedstock | 100 pts | 100 pts. |
| Normal paraffins | 10 to 12 | 100 pts. |
| Other hydrocarbons | 88 to 90 | Nil. |
| Fermenter product | 100 pts | 100 pts. |
| Normal paraffins | 0 to 0.5 | 0 to 1.0 |
| Other paraffins | 8.5 to 9.5 | Nil. |
| Aqueous phase | 85 to 95 | 97 to 98. |
| Yeast | 0.5 to 1.0 | 1 to 2. |
| Product after decanting | 100 pts | 100 pts. |
| Normal paraffins | 0 to 2.5 | 0 to 5. |
| Other paraffins | 40 to 50 | Nil. |
| Aqueous phase | 45 to 55 | 85 to 95. |
| Yeast | 2.5 to 5.0 | 5 to 10. |
| Product after centrifuging | 100 pts | 100 pts. |
| Normal paraffins | }15 to 40 | {0 to 5. |
| Other paraffins | | {Nil. |
| Aqueous phase | 45 to 60 | 70 to 80. |
| Yeast | 10 to 20 | 20 to 25. |
| Product after drum drying | 100 pts | 100 pts. |
| Normal paraffins | }20 to 50 | {0 to 20. |
| Other paraffins | | {Nil. |
| Aqueous phase | 5 to 10 | 5 to 10. |
| Yeast | 40 to 75 | 70 to 95. |
| Fraction taken above nip of rollers | 100 pts | Nil. |
| Normal paraffins | }60 to 95 | |
| Other paraffins | | |
| Aqueous phase | 0 to 30 | |
| Yeast | 5 to 10 | |
| Product after solvent extraction and vacuum drying: | | |
| Normal paraffins | }0.5 to 1.5 | {0 to 1.0 |
| Other paraffins | | {Nil. |
| Aqueous phase | Nil | Nil. |
| Yeast | 98.5 to 99.5 | 99.0 to 100. |
| Lipids (in whole yeast) | 7.0 to 12.0 | 7.0 to 12.0. |

The invention is illustrated but not limited with reference to the following examples.

EXAMPLE 1

10 litres of the following aqueous mineral medium was introduced into a 15 litre stirred fermenter; parts are by weight:

Sodium phosphate, tribasic _____ 3.4
Potassium chloride _____ 0.6
Magnesium sulphate _____ 0.3
Ammonium sulphate _____ 2.5

Made up to 1000 parts with soft water containing trace elements.

To the fermenter was added a few parts per million of yeast extract and then 50 grams of *Candida tropicalis* in the form of an aqueous cream containing 20% by wt. of dry material and then 150 grams of a heavy gas oil of petroleum origin containing 20% by wt. of normal paraffins.

When the culture reached the desired concentration of yeast cells for continuous operation, the continuous feed, to the fermenter, of aqueous mineral medium and petroleum oil was started up. The temperature was maintained at 30° C. and the pH of the medium was maintained at pH=4 by the addition of aqueous ammonia.

This emulsion was fed to a centrifugal separator from which were recovered three phases being, in increasing order of density; (a) an oil phase containing trace amounts of yeast cells, (b) an aqueous mineral medium phase (which may contain traces of oil and yeast) and (c) a yeast cream containing approximately 1 part of yeast, 4 parts of aqueous medium and a certain quantity of oil adhering to the yeast cells.

The yeast cream was fed to a drum drier consisting of twin horizontal rollers providing a nip and having the following characteristics:

Diameter of rolls—18 inches
Width of rolls—18 inches
Temperature—140° C.
Rate of revolution—30 revs. per minute Gas oil collected in the nip of the rolls and was drawn off. Dry yeast having a reduced content of gas oil (that is, having a gas oil content much less than the content of gas oil per unit weight of yeast in the feed material) was withdrawn by means of scrapers from below the nip of the rolls.

EXAMPLE 2

The material treated was a mixture of *Candida tropicalis*, water and gas oil.

This material was fed to a drum drier of the type and under the conditions described in Example 1.

The composition of the feed material and of the yeast product are shown in Table 1.

TABLE 1

|  | Percent weight | | |
|---|---|---|---|
|  | Solids | Oil | Water |
| Feed material | 21 | 20 | 59 |
| Drum dried yeast | 75 | 20 | 5 |

Thus the amount of gas oil based on gas oil and solids was reduced from 48% in the feed material to 21% in the dried product.

EXAMPLE 3

The material treated was a mixture of bakers yeast (*Saccharomyces cerevisiae*), water and gas oil.

This material was fed to a drum drier of the type and under the conditions described in Example 1.

Composition of feed material and of the yeast product are shown in the following Table 2.

TABLE 2

|  | Percent weight | | |
|---|---|---|---|
|  | Solids | Oil | $H_2O$ |
| Feed material | 28.0 | 17.0 | 55.0 |
| Drum dried yeast | 70.8 | 18.8 | 10.4 |

What we claim is:

1. A process for the removal, at least in part, of contaminants from a mixture of a micro-organism and contaminants, said contaminants consisting of or including a hydrocarbon oil and water, which comprises subjecting said mixture to drum drying in a drier having a pair of hot rolls which constitute a nip whereby at least part of the water is removed by evaporation and wherein an oil enriched product is removed from above the nip and a micro-organism enriched product is removed, from at least one roll, below the nip.

2. A process according to claim 1 in which the micro-organism enriched product, or a fraction derived from said product, is subjected to solvent extraction for the removal of at least part of the remaining hydrocarbon oil from association with the micro-organism.

3. A process according to claim 2 in which the solvent extraction is carried out in the presence, as solvent, of a hydrocarbon.

4. A process according to claim 2 in which the solvent extraction is carried out in the presence as solvent, of an alcohol.

5. A process according to claim 4 in which the alcohol is ethanol, propanol, isopropanol or a butanol.

6. A process according to claim 1 in which the mixture of micro-organism and contaminants is a product obtained by the aerobic cultivation of a micro-organism on a hydrocarbon substrate in the presence of an aqueous nutrient medium.

7. A process according to claim 1 in which the micro-organism is a normal paraffin-consuming micro-organism.

8. A process according to claim 7 in which the micro-organism is a yeast.

9. A process according to claim 8 in which the yeast is of the family Cryptococcaceae.

10. A process according to claim 9 in which the yeast is of the sub-family Cryptococcoideae.

11. A process according to claim 10 in which the yeast is of the genus Torulopsis.

12. A process according to claim 10 in which the yeast is of the genus Candida.

13. A process according to claim 12 in which the yeast is *Candida lipolytica*.

14. A process according to claim 13 in which the yeast is *Candida tropicalis*.

15. A process according to claim 1 in which the micro-organism is a bacterium.

16. A process according to claim 6 in which the feedstock is a petroleum fraction.

17. A process according to claim 1 in which the feedstock is a gas oil.

References Cited

UNITED STATES PATENTS 3,308,035   3/1967   Douros _____ 195—28

A. LOUIS MONACELL, Primary Examiner

S. RAND, Sr., Assistant Examiner

U.S. Cl. X.R.

195—105, 82